United States Patent
Liu et al.

(10) Patent No.: US 11,646,654 B2
(45) Date of Patent: *May 9, 2023

(54) RESONANT SWITCHING POWER CONVERTER CAPABLE OF PERFORMING DISCHARGING OPERATION IN A SEQUENTIAL ORDER

(71) Applicant: Richtek Technology Corporation, Zhubei (TW)

(72) Inventors: Kuo-Chi Liu, Hsinchu (TW); Ta-Yung Yang, Taoyuan (TW); Chung-Lung Pai, Hsinchu (TW)

(73) Assignee: RICHTEK TECHNOLOGY CORPORATION, Hsinchu (TW)

( * ) Notice: Subject to any disclaimer, the term of this patent is extended or adjusted under 35 U.S.C. 154(b) by 132 days.

This patent is subject to a terminal disclaimer.

(21) Appl. No.: 17/244,933

(22) Filed: Apr. 29, 2021

(65) Prior Publication Data

US 2021/0376717 A1 Dec. 2, 2021

Related U.S. Application Data

(60) Provisional application No. 63/029,714, filed on May 26, 2020.

(30) Foreign Application Priority Data

Sep. 15, 2020 (TW) ................. 109131757

(51) Int. Cl.
*H02M 3/07* (2006.01)
*H02M 3/00* (2006.01)

(52) U.S. Cl.
CPC .......... *H02M 3/01* (2021.05); *H02M 3/072* (2021.05)

(58) Field of Classification Search
CPC .................. H02M 3/01; H02M 3/07–078
See application file for complete search history.

(56) References Cited

U.S. PATENT DOCUMENTS

| | | |
|---|---|---|
| 9,831,776 B1 | 11/2017 | Jiang et al. |
| 9,917,517 B1 | 3/2018 | Jiang et al. |
| 2009/0097280 A1 | 4/2009 | Wu et al. |
| 2021/0175805 A1* | 6/2021 | Mercer ............... H02M 1/08 |
| 2021/0288581 A1* | 9/2021 | Zhu .................. H02M 1/0048 |

* cited by examiner

*Primary Examiner* — Peter M Novak
(74) *Attorney, Agent, or Firm* — Tung & Associates

(57) ABSTRACT

A resonant switching power converter includes: capacitors; switches; at least one charging inductor; at least one discharging inductor; a controller generating a charging operation signal corresponding to charging process and discharging operation signals corresponding to discharging processes, to operate the switches to switch electrical connection relationships of the capacitors. In the charging process, the controller controls the switches via the charging operation signal, so that a series connection of the capacitors and the charging inductor is formed between the input voltage and the output voltage, which forms a charging path. In the discharging processes, the controller controls the switches via the discharging operation signals, so that a series connection of one of the capacitors and the discharging inductor is formed between the output voltage and a ground voltage level, to form plural discharging paths at different periods in a sequential order.

17 Claims, 8 Drawing Sheets

RESONANT SWITCHING POWER CONVERTER CAPABLE OF PERFORMING DISCHARGING OPERATION IN A SEQUENTIAL ORDER

CROSS REFERENCE

The present invention claims priority to U.S. 63/029,714 filed on May 26, 2020 and claims priority to TW 109131757 filed on Sep. 15, 2020.

BACKGROUND OF THE INVENTION

Field of Invention

The present invention relates to a resonant switching power converter; particularly, it relates to such resonant switching power converter which is capable of performing discharging operation in an a sequential order.

Description of Related Art

Please refer to FIG. 1, which shows a schematic diagram of a conventional power converter. Under a charging operation, switches Q1, Q2, Q3 and Q4 are ON, whereas, switches Q5, Q6, Q7, Q8, Q9 and Q10 are OFF, so that a series connection of a capacitor C1, a capacitor C2 and a capacitor C3 is formed between an input voltage Vin and an output voltage Vout. On the other hand, under a discharging operation, switches Q5, Q6, Q7, Q8, Q9 and Q10 are ON, whereas, switches Q1, Q2, Q3 and Q4 are OFF, so that a parallel connection of the capacitor C1, the capacitor C2 and the capacitor C3 is formed between the ground voltage level and the output voltage Vout. Because the capacitors of such conventional power converter receive high inrush current, if the capacitances of the capacitor C1, the capacitor C2 and the capacitor C3 are different among one another, an undesirable circulation current among the capacitors will occur during discharging operation.

In view of the above, to overcome the drawbacks in the prior art, the present invention proposes an innovated power converter.

SUMMARY OF THE INVENTION

From one perspective, the present invention provides a resonant switching power converter, which is configured to operably convert an input voltage to an output voltage. The resonant switching power converter comprises: a plurality of capacitors; a plurality of switches, which are coupled to the plurality of capacitors; at least one charging inductor, which is connected in series to at least one of the plurality of capacitors; at least one discharging inductor, which is connected in series to at least one of the plurality of capacitors; and a controller, which is configured to operably generate a charging operation signal corresponding to a charging process and a plurality of discharging operation signals corresponding to a plurality of discharging processes, so as to operate the plurality of switches, so that the plurality of switches switch electrical connection relationships of the plurality of capacitors. Each of the charging operation signal and the discharging operation signals has a respective ON period, wherein the ON periods do not overlap one another, so that the charging process and the plurality of discharging processes do not overlap one another. In the charging process, the controller is configured to operably control the switching of the switches via the charging operation signal, so that a series connection of the capacitors and the at least one charging inductor is formed between the input voltage and the output voltage, which forms a charging path. In in each discharging process, the controller is configured to operably control the switching of the switches via a corresponding one of the discharging operation signals, so that a series connection of a corresponding one of the capacitors and a corresponding one of the at least one discharging inductor is formed between the output voltage and a ground voltage level, which forms a discharging path in each respective discharging process. Thus, a plurality of discharging paths are formed in a sequential order in the plurality of discharging processes. The charging process and the plurality of discharging processes are arranged in a repeated, alternating manner, so as to convert the input voltage to the output voltage.

In one embodiment, the resonant switching power converter further comprises: a zero current detection circuit coupled between the controller and the output voltage, wherein the zero current detection circuit is configured to operably detect a charging resonant current in the charging process or detect a discharging resonant current in the plurality of discharging processes, wherein when the zero current detection circuit detects that a level of the charging resonant current or a level of the discharging resonant current is zero, the zero current detection circuit is configured to operably generate a zero current detection signal, which is inputted into the controller.

In one embodiment, the zero current detection circuit includes: a current sensing circuit, which is configured to operably sense the charging resonant current in the charging processes or sense the discharging resonant current in the plurality of discharging processes, so as to generate a current sensing signal; and a comparison circuit, which is configured to operably compare the current sensing signal with a reference signal, so as to generate the zero current detection signal.

In one embodiment, the resonant switching power converter further comprises: a plurality of switch drivers, each of which is coupled between the controller and a corresponding one of the switches, wherein each switch driver is configured to operably control the corresponding switch according to the charging operation signal or the corresponding discharging operation signal.

In one embodiment, after the plurality of discharging processes in a present cycle have completed, a following charging process in a next cycle begins after a delay interval from the completion of the plurality of present discharging processes in the present cycle, wherein all of the switches that operate in the charging and discharging processes are nonconductive during the delay interval.

In one embodiment, the at least one charging inductor is one single charging inductor and the at least one discharging inductor is one single discharging inductor.

In one embodiment, an inductance of the single charging inductor is equal to an inductance of the single discharging inductor.

In one embodiment, the at least one charging inductor and the at least one discharging inductor is one same single inductor.

In one embodiment, the one same single inductor is a variable inductor.

In one embodiment, in the charging process and in the plurality of discharging processes, the resonant switching power converter changes a voltage conversion ratio of the input voltage to the output voltage by keeping at least one of the plurality of switches to be ON and keeping at least two of the plurality of switches to be OFF.

In one embodiment, the charging process has a charging resonant frequency, whereas, the plurality of discharging processes have a discharging resonant frequency, and wherein the charging resonant frequency is identical to the discharging resonant frequency.

In one embodiment, the charging process has a charging resonant frequency, whereas, the plurality of discharging processes have a discharging resonant frequency, and wherein the charging resonant frequency is different from the discharging resonant frequency.

In one embodiment, zero voltage switching is achieved by adjusting a duration period of the charging process.

In one embodiment, zero voltage switching is achieved by adjusting at least one duration period of the discharging processes.

In one embodiment, the resonant switching power converter is a bidirectional resonant switching power converter.

In one embodiment, a voltage conversion ratio of the input voltage to the output voltage of the resonant switching power converter is 4:1, 3:1 or 2:1.

In one embodiment, in the charging process, turned-ON time points and turned-OFF time points of the switches operating in the charging process are synchronous with a start time point and an end time point of a positive half wave of a charging resonant current of the charging process, so that zero current switching is achieved.

In one embodiment, in the plurality of discharging processes, turned-ON time point and turned-OFF time point of the switches operating in the plurality of discharging processes are synchronous with the start time point and the end time point of a positive half wave of a discharging resonant current of one of the plurality of discharging processes, so that zero current switching is achieved.

One advantage of the present invention is that the present invention can eliminate the issue of unwanted inrush current and the issue of unwanted circulation current.

Further advantages of the present invention include that: the present invention can achieve soft switching such as zero current switching and/or zero voltage switching by simpler control mechanism, and the present invention can compensate device parameter variations controlled by the DC bias voltage or operation temperature.

Still other advantages of the present invention include that: the present invention can reduce switching frequency, to improve light load efficiency; the present invention achieves better current voltage balance; the present invention can support a voltage conversion ratio (input voltage to output voltage) of the resonant switching power converter to be 3:1 or above.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1:
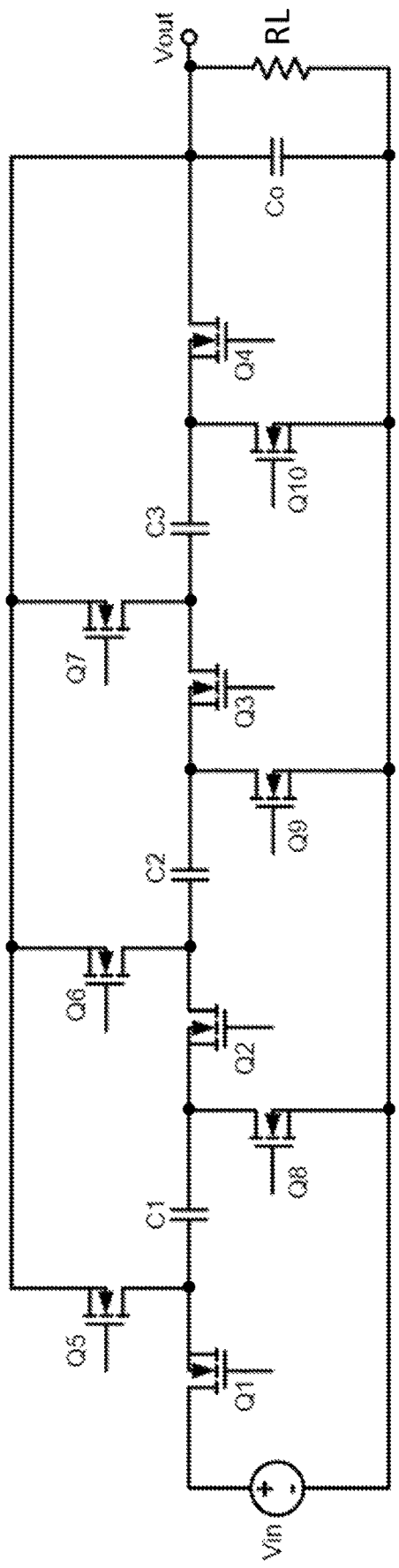
FIG. 1 shows a schematic diagram of a conventional power converter.
Figure 2A:
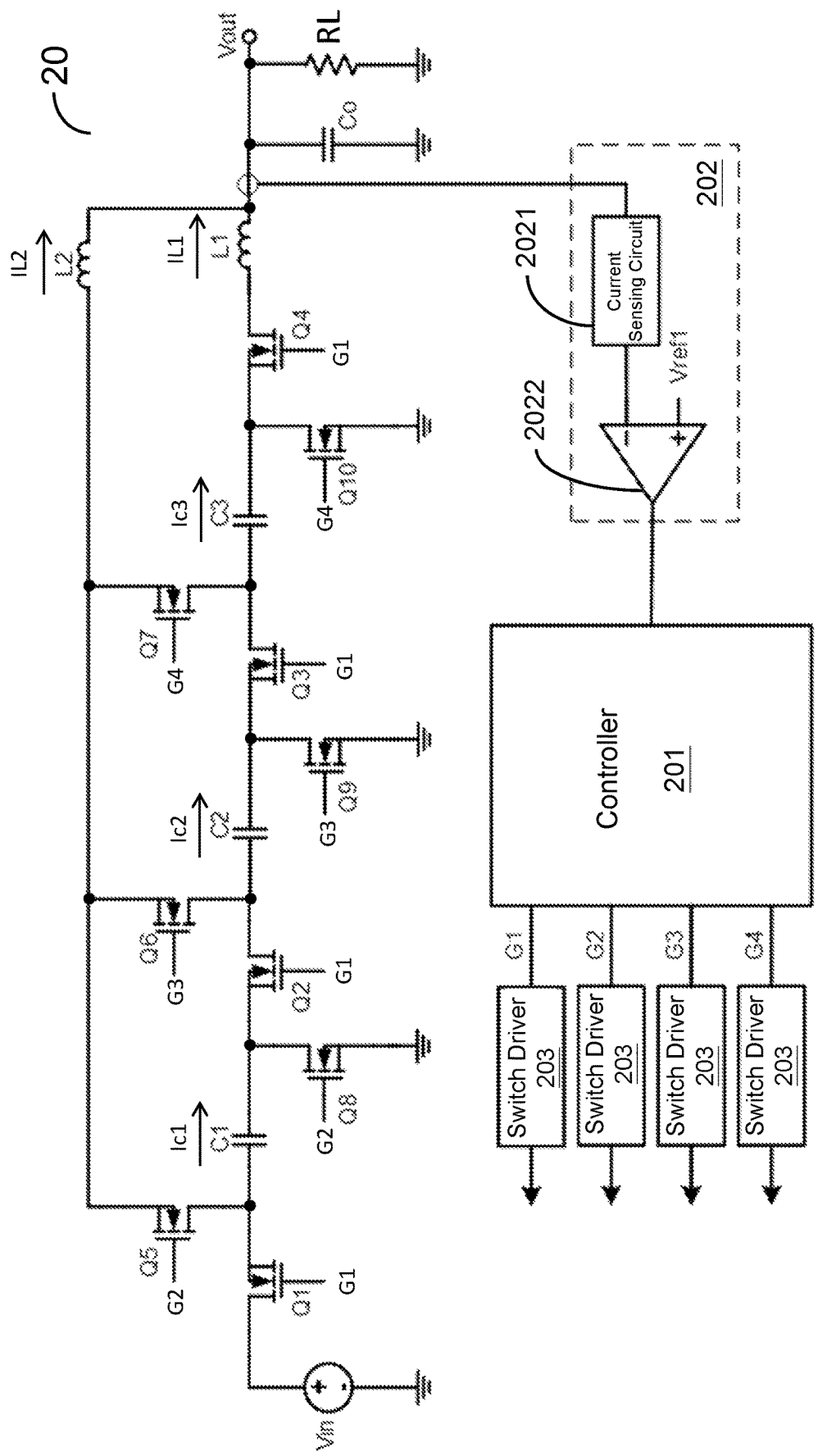
FIG. 2A shows a schematic circuit diagram of a resonant switching power converter according to an embodiment of the present invention.
Figure 2B:
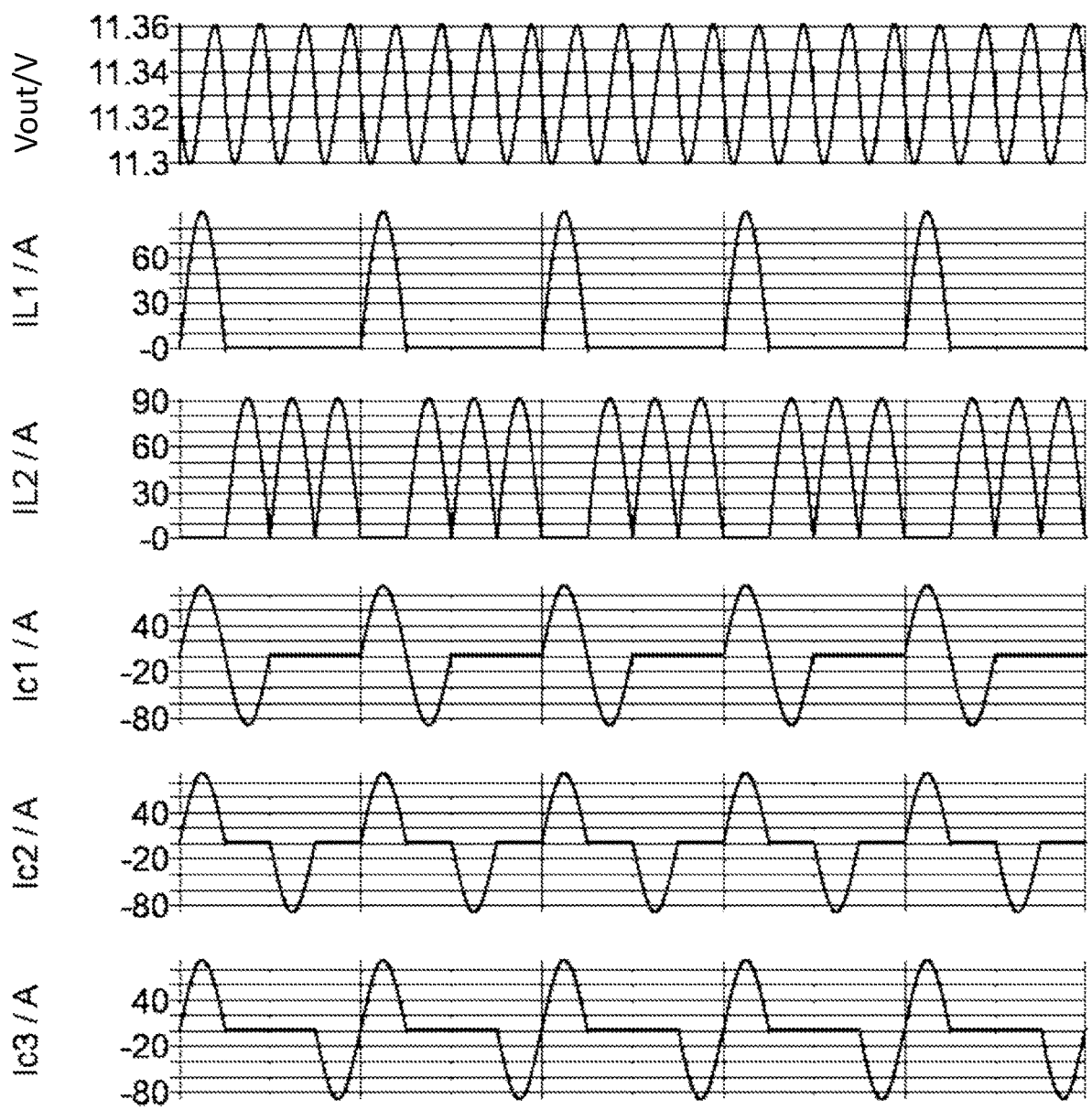
FIG. 2B illustrates waveform diagrams of relevant signals related to the operation of a resonant switching power converter of FIG. 2A.

Please refer to FIG. 2A and FIG. 2B. FIG. 2A shows a schematic circuit diagram of a resonant switching power converter according to an embodiment of the present invention. FIG. 2B illustrates waveform diagrams of relevant signals related to the operation of FIG. 2A. This embodiment includes several capacitors which share one charging inductor and/or one discharging inductor. Thus, although there are plural capacitors, regardless how many the capacitors may be, only one charging inductor and only one discharging inductor are required so that the required number of inductors is reduced. As shown in FIG. 2A, the resonant switching power converter 20 of the present invention comprises: capacitors C1, C2 and C3, switches Q1, Q2, Q3, Q4, Q5, Q6, Q7, Q8, Q9 and Q10, a charging inductor L1 and a discharging inductor L2, a controller 201, zero current detection circuit 202 and switch drivers 203. The switches Q1, Q2 and Q3 are connected in series to the corresponding capacitors C1, C2 and C3, respectively. The switch Q4 is connected in series to the charging inductor L1. Certainly, it should be understood that the implementation of the number of the capacitors of the resonant switching power converter 20 as three in the above-mentioned preferred embodiment is only an illustrative example, but not for limiting the broadest scope of the present invention. In other embodiments, it is also practicable and within the scope of the present invention that the number of the capacitors of the resonant switching power converter 20 can be any plural number other than three. It should be understood that the number of the devices in the above-mentioned preferred embodiment, unless emphasized as a feature, is only an illustrative example, but not for limiting the broadest scope of the present invention.

As shown in FIG. 2A, one end of the switch Q5 is coupled to a node between the switch Q1 and the capacitor C1. One end of the switch Q6 is coupled to a node between the switch Q2 and the capacitor C2. One end of the switch Q7 is coupled to a node between the switch Q3 and the capacitor C3. One end of the switch Q8 is coupled to a node between the switch Q2 and the capacitor C1. One end of the switch Q9 is coupled to a node between the switch Q3 and the capacitor C2. One end of the switch Q10 is coupled to a node between the switch Q4 and the capacitor C3. As shown in FIG. 2A, the other ends of the switches Q5-Q7 are commonly electrically connected to a node which is connected in series to the discharging inductor L2. The other ends of the switches Q8-Q10 are commonly coupled to the ground voltage level. The other ends of the charging inductor L1 and the discharging inductor L2 are commonly coupled to the output voltage Vout. The other end of the switch Q1 is coupled to input voltage Vin. (In the context of this invention, a switch is regarded as a two-end device and its control terminal is regarded as a control input, not an "end".)

The controller 201 is configured to operably generate a charging operation signal G1 corresponding to a charging process and discharging operation signals G2, G3 and G4 corresponding to plural discharging processes, so as to operate the switches Q1-Q10, so that the switches Q1-Q10 respectively switch electrical connection relationships of the corresponding capacitors C1-C3. Zero current detection circuit 202 is coupled between the controller 201 and the output voltage Vout. The zero current detection circuit 202 is configured to operably detect a charging resonant current IL1 flowing through a node between the charging inductor L1 and the output voltage Vout in the charging process or detect a discharging resonant current IL2 flowing through anode between the discharging inductor L2 and the output voltage Vout in the discharging processes. When the zero current detection circuit 202 detects that a level of the charging resonant current IL1 or a level of the discharging resonant current IL2 is zero, the zero current detection circuit 202 is configured to operably generate a zero current detection signal, which is inputted into the controller 201. In this embodiment, the zero current detection circuit 202 includes a current sensing circuit 2021, which is configured to operably sense the charging resonant current IL1 in the charging processes or sense the discharging resonant current IL2 in the discharging processes. The zero current detection circuit 202 further includes a comparison circuit 2022, which is configured to operably compare the sensed charging resonant current IL1 or discharging resonant current IL2 with a reference signal Vref1, so as to generate the zero current detection signal. The switch drivers 203 are coupled between the controller 201 and the corresponding switches Q1-Q10. Each switch driver 203 is configured to operably control a corresponding one of the switches Q1-Q10 according to the charging operation signal G1 or the corresponding discharging operation signals G2, G3 and G4.

The switches Q1-Q10 are controlled by the switch drivers 203 to respectively switch electrical connection relationships of the capacitors C1-C3 with the charging inductor L1 and the discharging inductor L2 according to the charging operation signal G1 and the discharging operation signals G2, G3 and G4 generated by the controller 201. In one embodiment, the charging operation signal G1 and the discharging operation signals G2, G3 and G4 have respective ON periods and these plural ON periods do not overlap one another. In a charging process, according to the charging operation signal G1, the switches Q1-Q4 are controlled to be ON, whereas, the switches Q5-Q10 are controlled to be OFF, so that a series connection of the capacitors C1-C3 and the charging inductor L1 is formed between the input voltage Vin and the output voltage Vout, which forms a charging path. In plural discharging processes, according to the discharging operation signals G2, G3 and G4, the switches Q5-Q10 are respectively controlled to be ON in turn, whereas, the switches Q1-Q4 are controlled to be OFF, so that the capacitors C1, C2 and C3 are respectively connected in series to the discharging inductor L2 in a sequential order, to form plural discharging paths. That is, one discharging path is formed in a corresponding one of the plural discharging processes, in a sequential order. For example, during a first time interval, according to the discharging operation signal G2, the switches Q5 and Q8 are controlled to be ON, whereas, the switches Q1-Q4, Q6-Q7 and Q9-Q10 are controlled to be OFF, so that a series connection of the capacitor C1 and the discharging inductor L2 is formed between the output voltage Vout and the ground voltage level, which forms a discharging path. During a second time interval, according to the discharging operation signal G3, the switches Q6 and Q9 are controlled to be ON, whereas, the switches Q1-Q5, Q7, Q8 and Q10 are controlled to be OFF, so that a series connection of the capacitor C2 and the discharging inductor L2 is formed between the output voltage Vout and the ground voltage level, which forms another discharging path. During a third time interval, according to the discharging operation signal G4, the switches Q7 and Q10 are controlled to be ON, whereas, the switches Q1-Q6 and Q8-Q9 are controlled to be OFF, so that a series connection of the capacitor C3 and the discharging inductor L2 is formed between the output voltage Vout and the ground voltage level, which forms still another discharging path.

It is noteworthy that, in one embodiment, the above-mentioned charging process and the above-mentioned plural discharging processes are arranged at different periods in a repeated, alternating manner. That is, the above-mentioned charging process and the above-mentioned plural discharging processes are not performed at the same time. In one embodiment, the charging process and each one of the discharging processes are arranged in a repeated, alternating manner, so as to convert the input voltage Vin to the output voltage Vout. In this embodiment, the DC bias voltages of the capacitors C1, C2 and C3 all have a level of Vo. Hence, as compared to the prior art, under the same level of the input voltage and the same level of the output voltage, the capacitors C1, C2 and C3 of the present invention will only need to withstand a relatively lower rated voltage. Hence, the present invention can use capacitors having a smaller size.

In one embodiment, the charging resonant frequency of the above-mentioned charging process is identical to the discharging resonant frequency of the above-mentioned discharging process. In one embodiment, the charging resonant frequency of the above-mentioned charging process is different from the discharging resonant frequency of the above-mentioned discharging process. In one embodiment, the above-mentioned resonant switching power converter 20 can be a bidirectional resonant switching power converter. As one of average skill in the art readily understands, in a "bidirectional resonant switching power converter", the input terminal (which is coupled to the input voltage Vin) and the output terminal (which is coupled the output voltage Vout) are interchangeable. That is, in the embodiment shown in FIG. 2A, the resonant switching power converter 20 can convert the output voltage Vout to the input voltage Vin. In one embodiment, a voltage conversion ratio of the input voltage Vin to the output voltage Vout of the above-mentioned resonant switching power converter 20 is 4:1, 3:1 or 2:1.

In one embodiment, the duration period (Ton1) of the above-mentioned charging process is correlated with the charging resonant frequency (fr1) of the above-mentioned charging process. In one embodiment, the duration period (Ton1) of the above-mentioned charging process is correlated with a positive half wave of a charging resonant current of the charging process. For example, turned-ON time points and turned-OFF time points of the switches Q1-Q4 are substantially synchronous with a start time point and an end time point of the positive half wave of the charging resonant current of the charging process. In one embodiment, the duration period (Ton2) of the above-mentioned discharging process is correlated with the discharging resonant frequency (fr2) of the above-mentioned discharging process. In one embodiment, the duration period (Ton2) of the above-mentioned plural discharging processes is correlated with a positive half wave of a discharging resonant current of the plural discharging processes. For example, turned-ON time points and turned-OFF time points of the switches Q5-Q10 are substantially synchronous with a start time point and an end time point of the positive half wave of the discharging resonant current of each respective discharging process.

In the embodiment wherein the charging resonant frequency (fr1) of the above-mentioned charging process is equal to the discharging resonant frequency (fr2) of each of the above-mentioned respective discharging processes, when the duration period (Ton1) of the above-mentioned charging process is equal to the duration period (Ton2) of each of the above-mentioned discharging processes (e.g., when the duration period (Ton1) of the above-mentioned charging process is equal to 25% of the cycle period, i.e., duty ratio=25%), the switches can be switched at a time point when the currents flowing through the switches are at a relatively lower level of their respective positive half waves, so that soft switching can be achieved. In one embodiment, zero current switching (ZCS) can be achieved.

Note that although it is preferred for the duration period of the charging process to be equal to the duration period of each of the discharging processes (in this embodiment this means that the duration period of the charging process is equal to 25% of the cycle period, i.e. duty ratio=25%), so that zero current switching can be achieved, however due to non-idealities controlled by for example imperfection of components or imperfect matching among components, the duration period of the charging process may not be exactly equal to 25% of the cycle period, but just close to 25% of the cycle period. In other words, according to the present invention, a certain level of error between the duration period of the charging process and 25% of the cycle period is acceptable, and therefore the term "substantially" is used to mean that an insignificant error within a tolerable range is acceptable. The term "substantially" used elsewhere in this specification also mean that an insignificant error within a tolerable range is acceptable.

In one embodiment, the duration period of the above-mentioned charging process is smaller than 25% of the cycle period by a predetermined period. Thus, after the first switches Q1-Q4 have been turned OFF, a little amount of current remains, which flows through the charging inductor L1 to take away accumulated charges stored in a parasitic capacitor of the switch Q10 via the parasitic diode of the first switch Q4, so that the voltage across the first switch Q10 can be reduced, thus achieving soft switching. In one embodiment, zero voltage switching (ZVS) can be achieved by adjusting the predetermined period. In one embodiment, the duration period of a last one of the above-mentioned plural discharging processes is greater than a specific ratio of the cycle period by a predetermined period. For example, the duration period of the above-mentioned discharging process is greater than 50% of the cycle period by a predetermined period. Thus, during the delayed turned-OFF period of the first switches Q5-Q10, a negative current of the discharging inductor L2 will flow through a parasitic diode of the first switch Q5, to charge a parasitic capacitor of the first switch Q1. As a result, the voltage across the first switch Q1 will be reduced, for achieving soft switching. In one embodiment, zero voltage switching (ZVS) can be achieved by adjusting the predetermined period.

Let it be assumed that C1=C2=C3=C. The charging resonant frequency (fr1) of the above-mentioned charging process and the respective discharging resonant frequency (fr2) of the above-mentioned respective discharging processes can be represented by the following equations:

$$fr1 = \frac{1}{2\pi\sqrt{L1 \times C/3}} \quad (1)$$

$$fr2 = \frac{1}{2\pi\sqrt{L2 \times C}} \quad (2)$$

Besides, it is desired to achieve fr1=fr2 (as described above), so the following equation can be obtained through combining the equation (1) and the equation (2).

$$\frac{1}{2\pi\sqrt{L1 \times C/3}} = \frac{1}{2\pi\sqrt{L2 \times C}}$$

Accordingly, the inductance of the charging inductor L1 and the inductance of the discharging inductor L2 should meet the following equation:

$$L2 = \tfrac{1}{3}L1 \quad (3)$$

That is, if it is intended to ensure that the charging resonant frequency (fr1) of the above-mentioned charging process is equal to the discharging resonant frequency (fr2) of the above-mentioned discharging process (i.e., if it is intended to ensure fr1=fr2), the inductance of the charging inductor L1 and the inductance of the discharging inductor L2 should be designed to comply with the relationship addressed in the equation (3).

FIG. 2B illustrates waveform diagrams of relevant signals related to the operation of FIG. 2A. The waveform diagrams of the output voltage Vout, the charging resonant current IL1, the discharging resonant current IL2, a current Ic1 flowing through the capacitor C1, a current Ic2 flowing through the capacitor C2 and a current Ic3 flowing through the capacitor C3 are as shown in FIG. 2B. In this embodiment, the charging resonant frequency is equal to the discharging resonant frequency. And, the duration period of the charging process is equal to the respective duration period of the respective discharging processes, wherein the duration period of the charging process and the respective duration period of the respective discharging processes are substantially equal to 25% of the cycle period (i.e., each having a duty ratio which is equal to 25%).

In another embodiment, in a case where the inductance of the charging inductor L1 is equal to the inductance of the discharging inductor L2 and in a case where it is assumed that C1=C2=C3=C, the equation (1) and equation (2) can be rewritten and represented by the following equations:

$$fr1 = \frac{1}{2\pi\sqrt{L1 \times C/3}}$$

$$fr2 = \frac{1}{2\pi\sqrt{L1 \times C}}$$

According to the above-mentioned equations, it can be realized that in a case where the inductance of the charging inductor L1 is equal to the inductance of the discharging inductor L2, the charging resonant frequency is not equal to the discharging resonant frequency. Under such situation, if it is intended to achieve ZCS, the duration period (Ton1) should be set as a half period of the corresponding charging resonant frequency (fr1) should be set as a half period of the corresponding charging resonant frequency (fr1) and the duration period (Ton2) should be set as a half period of the corresponding discharging resonant frequency (fr2), which can be represented by the following equations:

$$Ton1 = \frac{1}{2fr1}$$

$$Ton2 = \frac{1}{2fr2}$$

If it is intended to achieve ZCS, in light of the above-mentioned equations, the duration period (Ton1) and the duration period (Ton2) should comply with the following relationship:

$$\frac{Ton1}{Ton2} = \frac{1/2fr1}{1/2fr2} = \frac{fr2}{fr1} = \frac{2\pi\sqrt{L1 \times C/3}}{2\pi\sqrt{L1 \times C}} = \frac{1}{\sqrt{3}} \quad (4)$$

That is, in a case where the inductance of the charging inductor L1 is equal to the inductance of the discharging inductor L2, the duration period (Ton2) of the discharging process should be set as being $\sqrt{3}$ a times of the duration period (Ton1) of the charging process. That is, if the duration period (Ton1) of the charging process is substantially equal to 16% of the cycle period, whereas, the duration period (Ton2) of the discharging process is substantially equal to 28% of the cycle period, zero current switching is still achievable.

In a specific preferred embodiment, the charging inductor L1 and the discharging inductor L2 can be one same single inductor, which functions as the charging inductor and the discharging inductor at different periods, respectively.

Figure 3A:
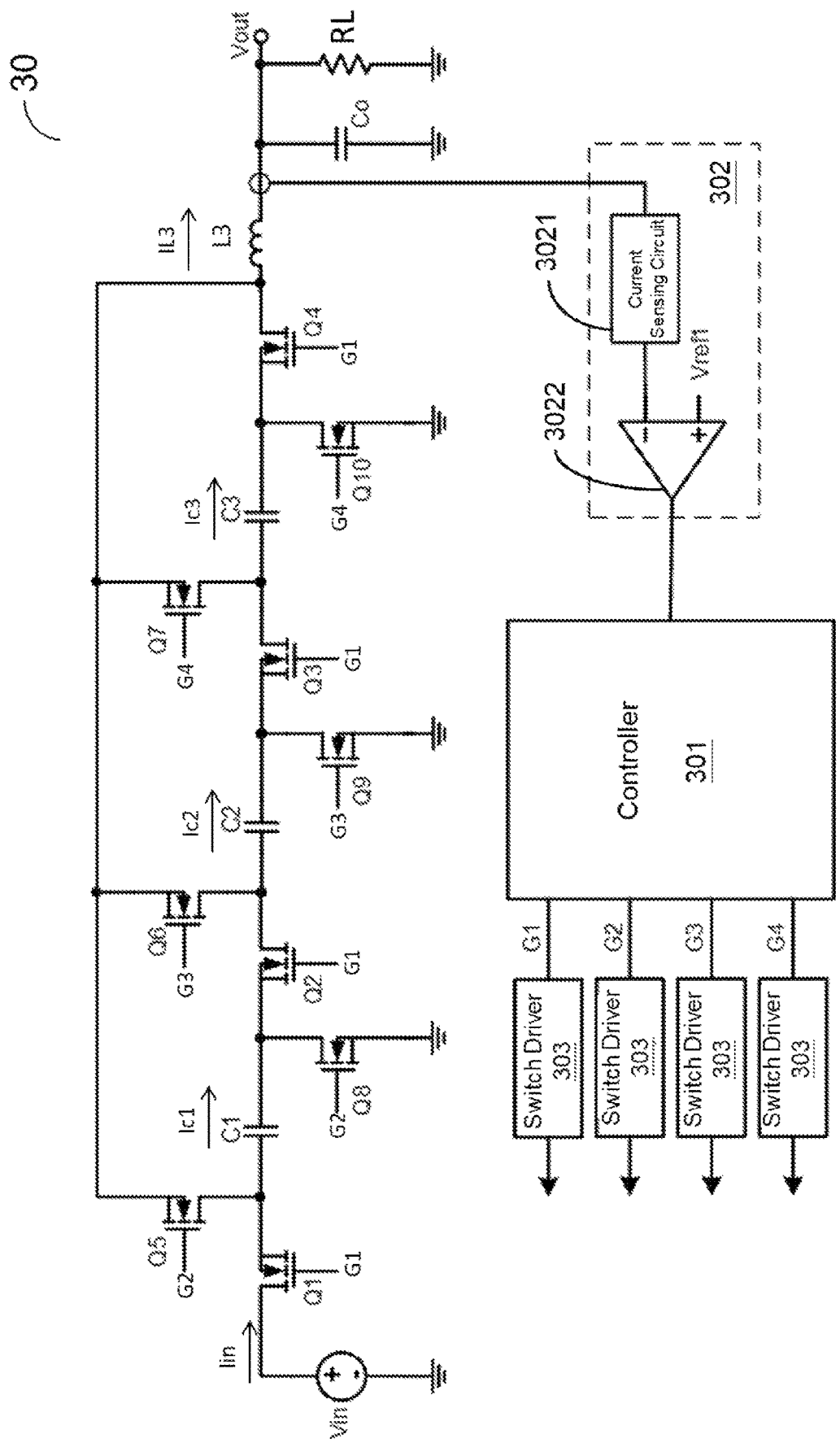
FIG. 3A shows a schematic circuit diagram of a resonant switching power converter according to another embodiment of the present invention.
Figure 3B:
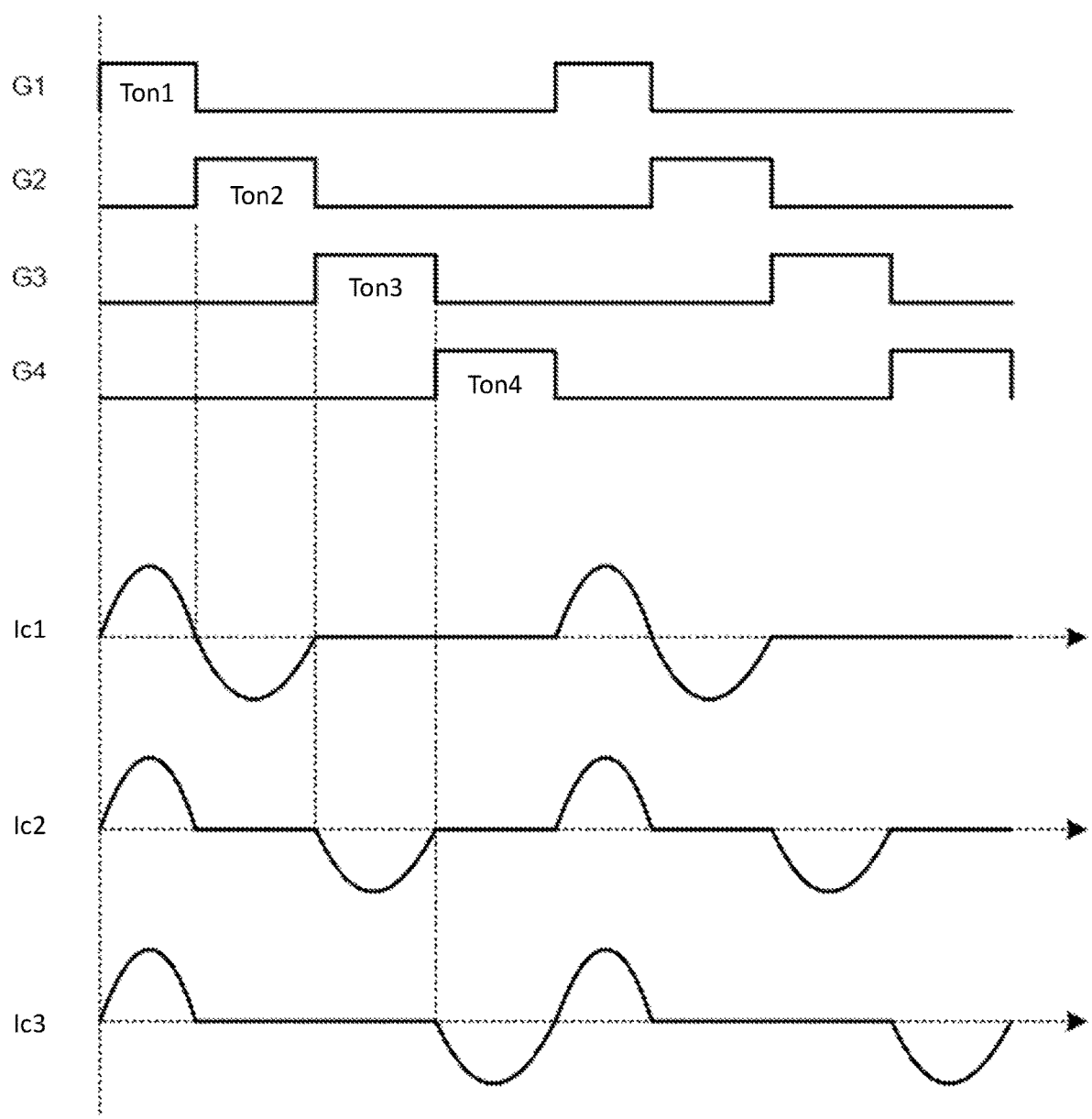
FIG. 3B illustrates waveform diagrams of operation signals and capacitor currents corresponding to a charging process and plural discharging processes.
Figure 3C:
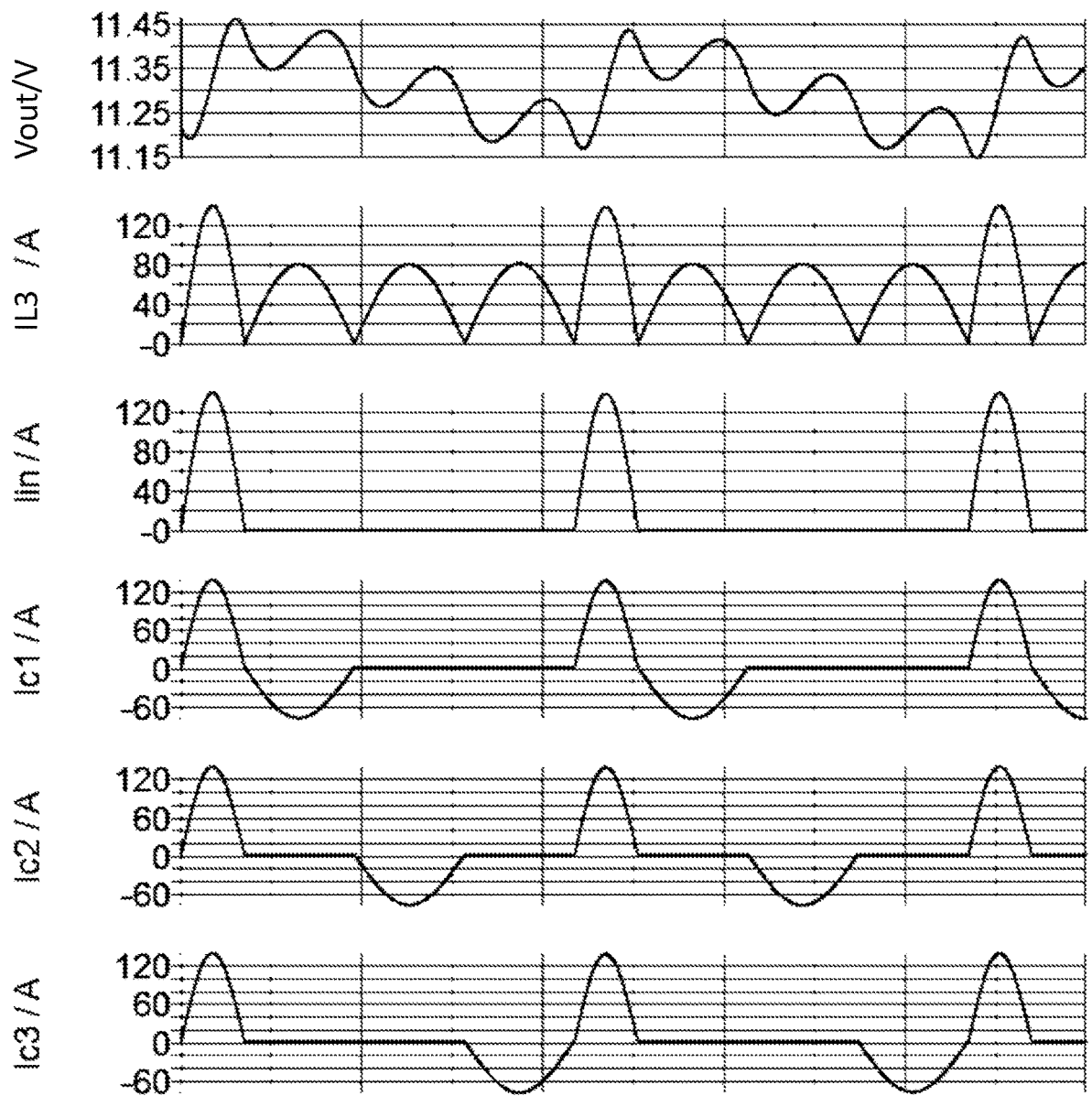
FIG. 3C illustrates waveform diagrams of relevant signals related to the operation of a resonant switching power converter in FIG. 3A.

Please refer to FIGS. 3A-3C. FIG. 3A shows a schematic circuit diagram of a resonant switching power converter according to another embodiment of the present invention. FIG. 3B illustrates waveform diagrams of operation signals and capacitor currents corresponding to a charging process and discharging processes. FIG. 3C illustrates waveform diagrams of relevant signals related to the operation of a resonant switching power converter in FIG. 3A. In this embodiment, the charging inductor and the discharging inductor can be one same inductor L3. This embodiment can reduce the required inductor number. As shown in FIG. 3A, the resonant switching power converter 30 of the present invention comprises: capacitors C1, C2 and C3, switches Q1, Q2, Q3, Q4, Q5, Q6, Q7, Q8, Q9 and Q10, an inductor L3, a controller 301, aczero current detection circuit 302 and switch drivers 303. The switches Q1, Q2 and Q3 are connected in series to the corresponding capacitors C1, C2 and C3, respectively. The switch Q4 is connected in series to the inductor L1. Certainly, it should be understood that the implementation of the number of the capacitors of the resonant switching power converter 30 as three in the above-mentioned preferred embodiment is only an illustrative example, but not for limiting the broadest scope of the present invention. In other embodiments, it is also practicable and within the scope of the present invention that the number of the capacitors of the resonant switching power converter 30 can be any plural number other than three. It should be understood that the number of the devices in the above-mentioned preferred embodiment, unless emphasized as a feature, is only an illustrative example, but not for limiting the broadest scope of the present invention.

It is noteworthy that, in this embodiment, the charging inductor and the discharging inductor is one same single inductor L3. In the plural discharging processes, through switching the switches Q1-Q10, the capacitors C1-C3 are respectively connected in series to the same single inductor L3 in a sequential order. As one of average skill in the art readily understands, when the charging inductor and the discharging inductor is one same single inductor L3, the charging resonant current and discharging resonant current flow through one single inductor L3 during the charging process and the plural discharging processes, respectively, but neither the charging resonant current IL3 nor the discharging resonant current IL3 flows through any other inductor. In one embodiment, the inductor L3 can be a variable inductor.

As shown in FIG. 3A, one end of the switch Q5 is coupled to a node between the switch Q1 and the capacitor C1. One end of the switch Q6 is coupled to a node between the switch Q2 and the capacitor C2. One end of the switch Q7 is coupled to a node between the switch Q3 and the capacitor C3. One end of the switch Q8 is coupled to a node between the switch Q2 and the capacitor C1. One end of the switch Q9 is coupled to a node between the switch Q3 and the capacitor C2. One end of the switch Q10 is coupled to a node between the switch Q4 and the capacitor C3. As shown in FIG. 3A, the other ends of the switches Q5-Q7 are commonly electrically connected to a node which is connected in series to a node between the switch Q4 and the inductor L3. The other ends of the switches Q8-Q10 are commonly coupled to the ground voltage level. The other end of the inductor L3 is coupled to the output voltage Vout. The other end of the switch Q1 is coupled to input voltage Vin. The controller 301 is configured to operably generate a charging operation signal G1 corresponding to a charging process and discharging operation signals G2, G3 and G4 corresponding to plural discharging processes, so as to operate the switches Q1-Q10, so that the switches Q1-Q10 respectively switch electrical connection relationships of the corresponding capacitors C1-C3. The zero current detection circuit 302 is coupled between the controller 301 and the output voltage Vout. The zero current detection circuit 302 is configured to operably detect a charging resonant current IL3 flowing through a node between the inductor L3 and the output voltage Vout in the charging process or detect a discharging resonant current IL3 flowing through a node between the inductor L3 and the output voltage Vout in the discharging processes. When the zero current detection circuit 302 detects that a level of the charging resonant current IL3 or a level of the discharging resonant current IL3 is zero, the zero current detection circuit 302 generates a zero current detection signal, which is inputted into the controller 301. In this embodiment, the zero current detection circuit 302 includes a current sensing circuit 3021, which is configured to operably sense the charging resonant current IL3 in the charging processes or sense the discharging resonant current IL3 in the discharging processes. The zero current detection circuit 302 further includes a comparison circuit 3022, which is configured to operably compare the sensed charging resonant current IL3 or discharging resonant current IL3 with a reference signal Vref1, so as to generate the zero current detection signal. The switch drivers 303 are respectively coupled between the controller 301 and the corresponding switches Q1-Q10. Each switch driver 303 is configured to operably control a corresponding one of the switches Q1-Q10 according to the charging operation signal G1 or the discharging operation signals G2, G3 and G4.

The switches Q1-Q10 are controlled by the switch drivers 303 to respectively switch electrical connection relationships between the corresponding capacitors C1-C3 and the inductor L3 according to the charging operation signal G1 and the discharging operation signals G2, G3 and G4 generated by the controller 301. In one embodiment, the charging operation signal G1 and the discharging operation signals G2, G3 and G4 have respective ON periods and these plural ON periods do not overlap one another. Please refer to FIG. 3A in conjugation with FIG. 3B. In a charging process, during a duration period (Ton1), according to the charging operation signal G1, the switches Q1-Q4 are controlled to be ON, whereas, the switches Q5-Q10 are controlled to be OFF, so that a series connection of the capacitors C1-C3 and the inductor L3 is formed between the input voltage Vin and the output voltage Vout, which forms a charging path. In plural discharging process, according to discharging operation signals G2, G3 and G4, the switches Q5-Q10 are respectively controlled to be ON in turn, whereas, the switches Q1-Q4 are controlled to be OFF, so that the capacitors C1, C2 and C3 are respectively connected in series to the inductor L3 in a sequential order, which forms plural discharging paths at different periods.

Please refer to FIG. 3A in conjugation with FIG. 3B. For example, during a duration period (Ton2), according to the discharging operation signal G2, the switches Q5 and Q8 are controlled to be ON, whereas, the switches Q1-Q4, Q6-Q7 and Q9-Q10 are controlled to be OFF, so that a series connection of the capacitor C1 and the inductor L3 is formed between the output voltage Vout and the ground voltage level, which forms a discharging path. During a duration period (Ton3), according to the discharging operation signal G3, the switches Q6 and Q9 are controlled to be ON, whereas, the switches Q1-Q5, Q7, Q8 and Q10 are controlled to be OFF, so that a series connection of the capacitor C2 and the inductor L3 is formed between the output voltage Vout and the ground voltage level, which forms another discharging path. During a duration period (Ton4), according to the discharging operation signal G4, the switches Q7 and Q10 are controlled to be ON, whereas, the switches Q1-Q6 and Q8-Q9 are controlled to be OFF, so that a series connection of the capacitor C3 and the inductor L3 is formed between the output voltage Vout and the ground voltage level, which forms still another discharging path. It is noteworthy that, in one embodiment, the above-mentioned charging process and the above-mentioned plural discharging processes are arranged at different periods in a repeated, alternating manner, to convert the input voltage Vin to an output voltage Vout. That is, the above-mentioned charging process and the above-mentioned discharging process are not performed at the same time. In this embodiment, the DC bias voltages of the capacitors C1, C2 and C3 all have a level of Vo. Hence, as compared to the prior art, under the same level of the input voltage and the same level of the output voltage, the capacitors C1, C2 and C3 of the present invention will only need to withstand a relatively lower rated voltage. Hence, the present invention can use capacitors having a smaller size.

In the embodiment where the charging inductor and the discharging inductor are implemented as one same single inductor L1, zero current switching (ZCS), which is one form of soft switching, can be achieved by properly arranging a ratio of the duration period (Ton1) of the above-mentioned charging process to the duration period (Ton2) of the above-mentioned discharging process according to the above-mentioned equations. To be more specific, in one embodiment, the duration period of the above-mentioned charging process can be substantially equal to for example 16% of the cycle period (i.e. duty ratio=16%). the switches can be switched at a time point when the currents flowing through the switches are at a relatively lower level of their respective positive half waves, so that soft switching can be achieved. In one embodiment, zero current switching (ZCS) can be achieved. In one embodiment, the duration period of the above-mentioned charging process is smaller than 16% of the cycle period by a predetermined period. Thus, after the first switches Q1-Q4 have been turned OFF, a little amount of current remains, which flows through the inductor L3 to take away accumulated charges stored in a parasitic capacitor of the switch Q10 via the parasitic diode of the first switch Q4, so that the voltage across the first switch Q10 can be reduced, thus achieving soft switching. In one embodiment, zero voltage switching (ZVS) can be achieved by adjusting the predetermined period. In one embodiment, the duration period of a last one of the above-mentioned plural discharging processes is greater than 28% of the cycle period by a predetermined period. Thus, during the delayed turned-OFF period of the first switches Q5-Q10, a negative current of the inductor L3 will flow through a parasitic diode of the first switch Q5, to charge a parasitic capacitor of the first switch Q1. As a result, the voltage across the first switch Q1 will be reduced, for achieving soft switching. In one embodiment, zero voltage switching (ZVS) can be achieved by adjusting the predetermined period.

In one embodiment, the above-mentioned resonant switching power converter 30 can be a bidirectional resonant switching power converter. In one embodiment, a voltage conversion ratio of the input voltage Vin to the output voltage Vout of the above-mentioned resonant switching power converter 30 is 4:1, 3:1 or 2:1. In one embodiment, a voltage conversion ratio of the above-mentioned resonant switching power converter 30 can be flexibly adjusted. For example, in the charging process and in the discharging process, by keeping the switch Q7 to be always ON keeping causing the switches Q4 and Q10 to be always OFF, the voltage conversion ratio of the resonant switching power converter 30 can be adjusted to 3:1. For another example, in the charging process and in the discharging process, by keeping the switch Q6 to be always ON while keeping the switches Q9, Q3, Q7, Q4 and Q10 to be always OFF, the voltage conversion ratio of the resonant switching power converter 30 can be adjusted to 2:1.

Please refer to FIG. 3B, which illustrates waveform diagrams of operation signals and capacitor currents corresponding to a charging process and discharging processes. As shown in FIG. 3B, the duration period (Ton2) of the first discharging process is set as being $\sqrt{3}$ fold of the duration period (Ton1) of the charging process; the duration period (Ton3) of the second discharging process is set as being $\sqrt{3}$ fold of the duration period (Ton1) of the charging process; the duration period (Ton4) of the third discharging process is set as being $\sqrt{3}$ fold of the duration period (Ton1) of the charging process. Please refer to FIG. 3C, which illustrates waveform diagrams of relevant signals related to the operation of the resonant switching power converter in FIG. 3A. The waveform diagrams of the output voltage Vout, the charging resonant current IL3, the input current Iin, a current Ic1 flowing through the capacitor C1, a current Ic2 flowing through the capacitor C2 and a current Ic3 flowing through the capacitor C3 are as shown in FIG. 3C. In this embodiment, the charging resonant frequency is equal to the discharging resonant frequency of each discharging process. The duration period of the charging process is substantially equal to 16% of the cycle period (i.e. duty ratio=16%), whereas, the duration period of each discharging process is substantially equal to 28% of the cycle period (i.e. duty ratio=28%).

Figure 4A:
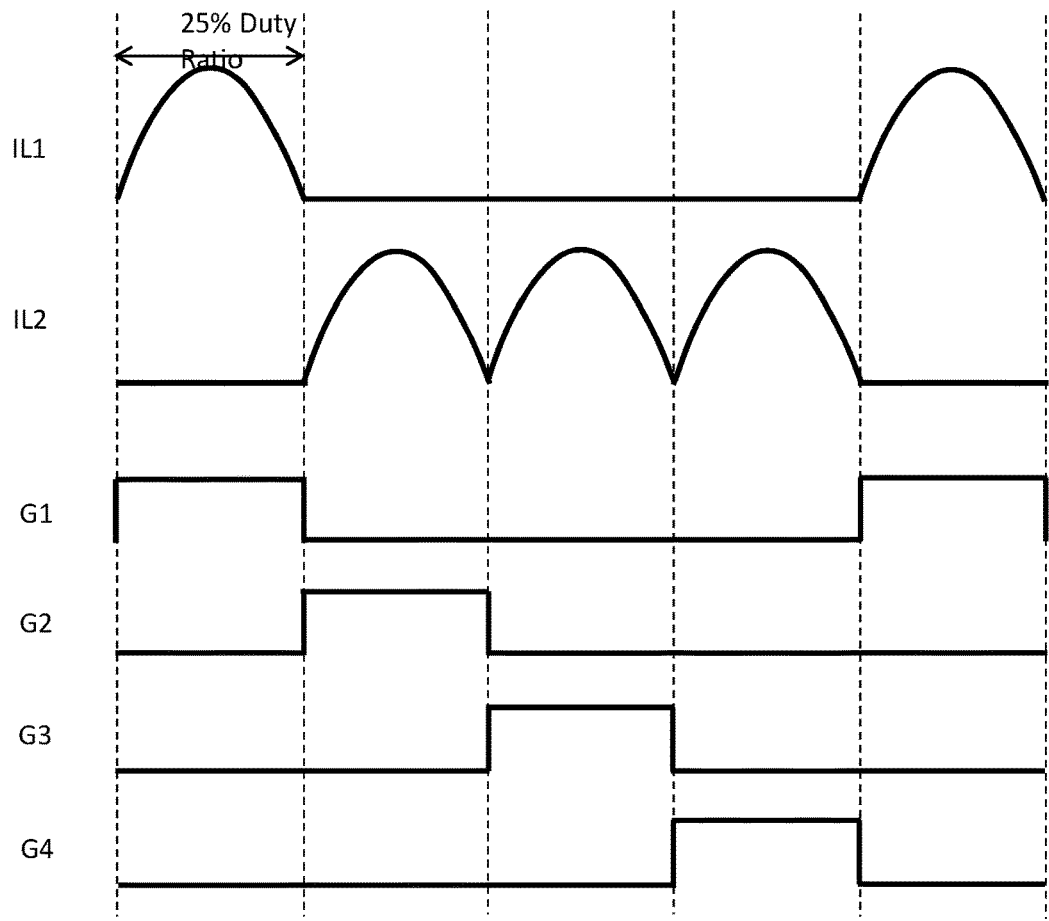
FIGS. 4A-4C illustrate waveform diagrams of operation signals and inductor currents corresponding to charging and discharging processes.

Please refer to FIG. 4A, which illustrates an embodiment of waveform diagrams of operation signals and inductor currents corresponding to a charging process and a discharging process. Please refer to FIG. 2A along with FIG. 4A. In the embodiment shown in FIG. 4A, the charging operation signal G1 corresponding to the switches Q1-Q4 are at high level in the charging process, whereas, the discharging operation signals G2-G4 corresponding to the switches Q5-Q10 are at high level in the discharging process. In the embodiment shown in FIG. 4A, the duration period of the charging process is substantially equal to 25% of the cycle period (i.e. duty ratio=25%). As a result, the switches can be switched at a time point when the current flowing through the switch Q1 are at a relatively lower level of its positive half wave (i.e., when a current IL1 flowing through the charging inductor L1 is substantially equal to zero), so that soft switching can be achieved. In one embodiment, zero current switching (ZCS) can be achieved.

Figure 4B:
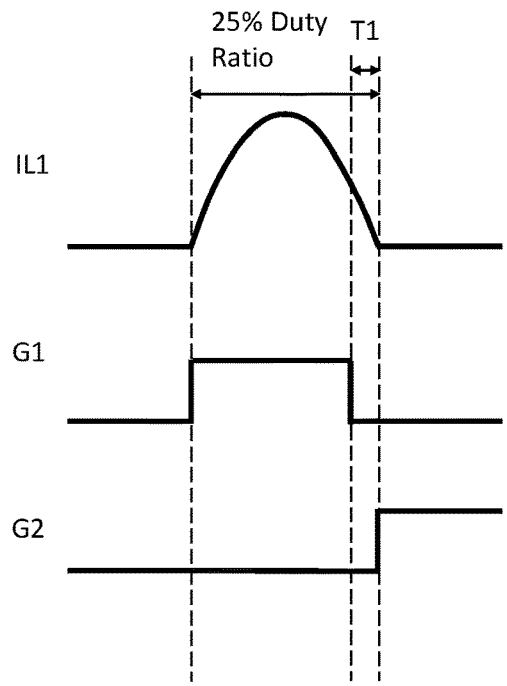
Figure 4C:
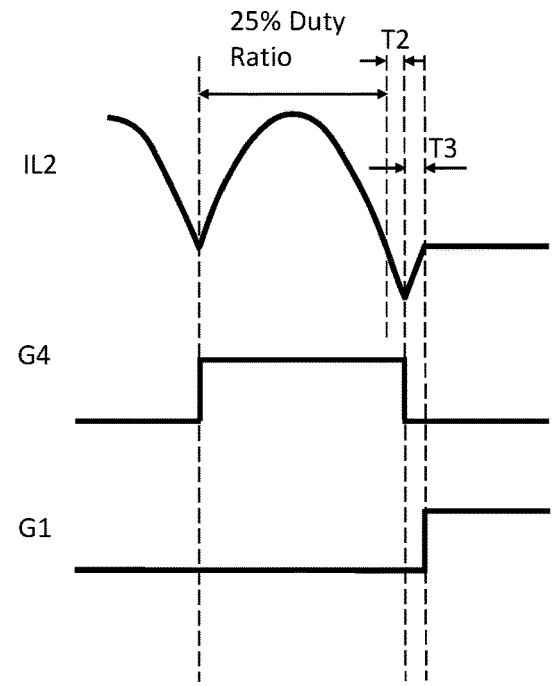
Figure 4D:
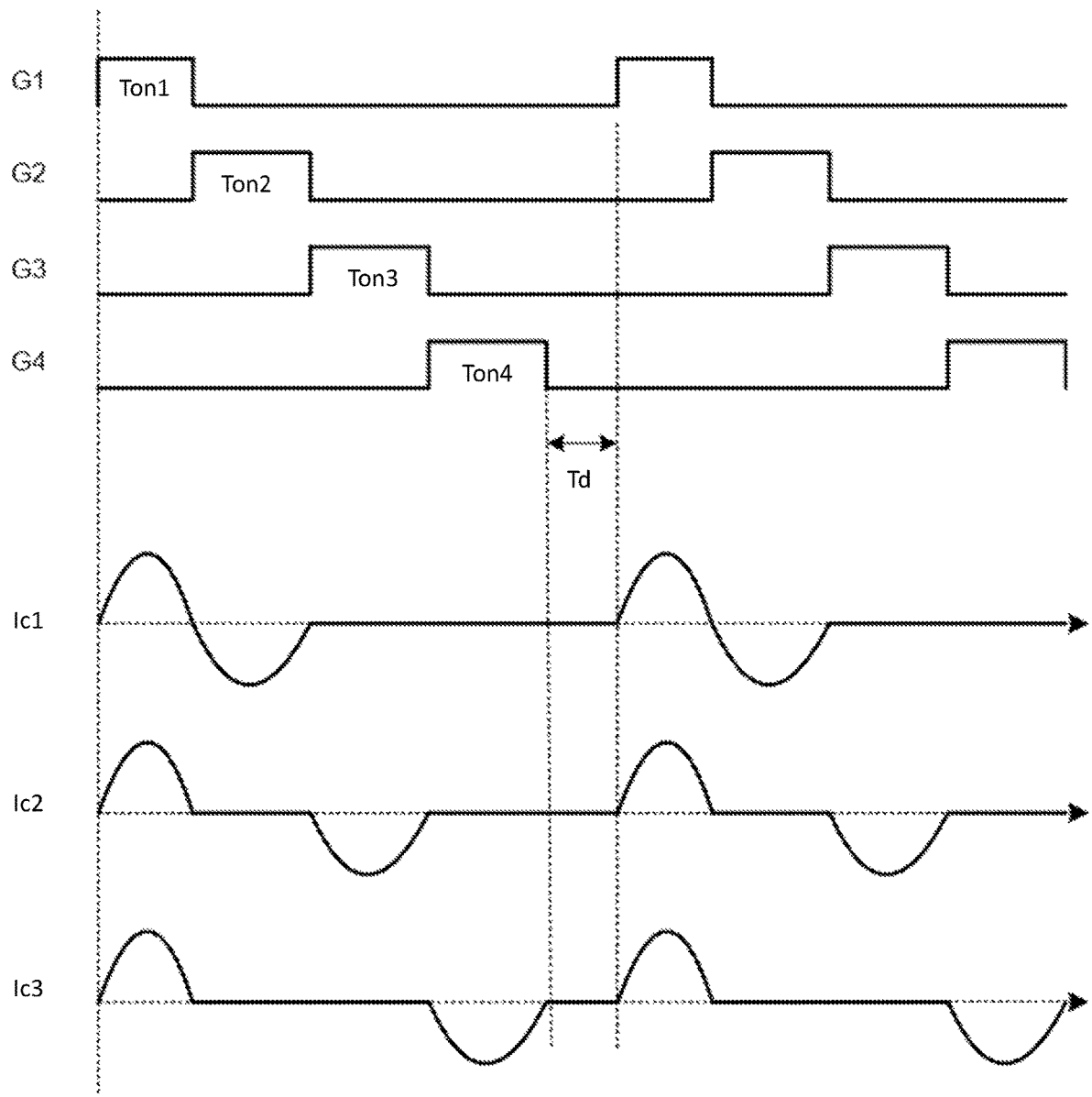
FIG. 4D illustrates waveform diagrams of operation signals and a capacitor current corresponding to charging and discharging processes.

Please refer to FIGS. 4B-4C, which illustrate another embodiment of waveform diagrams of operation signals and inductor currents corresponding to a charging process and a discharging process. Please refer to FIG. 2A along with FIG. 4B. In the embodiment shown in FIG. 5B, the charging operation signal G1 corresponding to the switches Q1-Q4 are at high level in the charging process, whereas, the discharging operation signal G2 corresponding to the switches Q5 and Q8 are at high level in the discharging process. In the embodiment shown in FIG. 4B, the duration period of the charging process is substantially smaller than 25% of the cycle period by a predetermined period T1. Thus, after the first switches Q1-Q4 have been turned OFF, a little amount of current remains, which flows through the charging inductor L1 to take away accumulated charges stored in a parasitic capacitor of the switch Q10 via the parasitic diode of the first switch Q4, so that the voltage across the first switch Q10 can be reduced, thus achieving soft switching. In one embodiment, zero voltage switching (ZVS) can be achieved by adjusting the predetermined period T1. Please refer to FIG. 2A along with FIG. 4C. In the embodiment shown in FIG. 5C, the charging operation signal G1 corresponding to the switches Q1~Q4 are at high level in the charging process, whereas, the discharging operation signal G4 corresponding to the switches Q7 and Q10 are at high level in the discharging process. In the embodiment shown in FIG. 4C, the duration period of the discharging process is greater than 25% of the cycle period by a predetermined period T2+T3. Thus, during the delayed turned-OFF period of the first switches Q5-Q10, a negative current of the discharging inductor L2 will flow through a parasitic diode of the first switch Q5, to charge a parasitic capacitor of the first switch Q1. As a result, the voltage across the first switch Q1 will be reduced, for achieving soft switching. In one embodiment, zero voltage switching (ZVS) can be achieved by adjusting the predetermined period T2+T3. It is noteworthy that, in one embodiment, the embodiment of FIG. 4B and the embodiment of FIG. 4C can be implemented in combination or alone. Besides, please refer to FIG. 4D, which illustrates yet another embodiment of waveform diagrams of operation signals and a capacitor current corresponding to a charging process and a discharging process. Please refer to FIG. 2A along with FIG. 4D. As shown in FIG. 4D, in this embodiment, at least one of the duration period of the charging process and the duration period of the respective discharging processes is adjustable. For example, a delayed period Td can be provided after a last one of the plural discharging processes. As such, this embodiment can more flexibly adjust the ratio of the input voltage Vin to the output voltage Vout. In one embodiment, during the delayed period Td, all the switches are OFF.

It is noteworthy that, as one of average skill in the art readily understands, when "turned-ON time points and turned-OFF time points of the switches are substantially synchronous with a start time point and an end time point of the positive half wave of the charging resonant current of the charging process", it means that: the turned-ON time points and turned-OFF time points of the switches coincide with the start time point and the end time point of the positive half wave of the charging resonant current of the charging process, respectively, or, there is a constant interval between the turned-ON time points of the switches and the start time point of the positive half wave of the charging resonant current of the charging process, and between the turned-OFF time points of the switches and the end time point of the positive half wave of the charging resonant current of the charging process. When "turned-ON time points and turned-OFF time points of the switches are substantially synchronous with a start time point and an end time point of the positive half wave of the discharging resonant current of the discharging process", it means that: the turned-ON time points and turned-OFF time points of the switches coincide with the start time point and the end time point of the positive half wave of the discharging resonant current of the discharging process, respectively, or, there is a constant interval between the turned-ON time points of the switches and the start time point of the positive half wave of the discharging resonant current of the discharging process, and between the turned-OFF time points of the switches and the end time point of the positive half wave of the discharging resonant current of the discharging process.

The present invention provides a resonant switching power converter as described above. The present invention has the following merits that: the present invention can eliminate the issue of undesired inrush current and circulation current; the present invention can achieve soft switching such as zero current switching and/or zero voltage switching; the present invention can compensate device parameter variations (e.g., variation in capacitance) caused by a DC bias voltage or operation temperature; the present invention can reduce switching frequency, so as to improve light load efficiency; the present invention achieves better current voltage balance; the present invention can provide a resonant switching power converter having a voltage conversion ratio of the input voltage to the output voltage which is equal to 3:1 or above.

The present invention has been described in considerable detail with reference to certain preferred embodiments thereof. It should be understood that the description is for illustrative purpose, not for limiting the scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A resonant switching power converter, which is configured to operably convert an input voltage to an output voltage; the resonant switching power converter comprising:
   a plurality of capacitors;
   a plurality of switches, which are coupled to the plurality of capacitors;
   at least one inductor, which is connected in series to at least one of the plurality of capacitors;
   a controller, which is configured to operably generate a charging operation signal corresponding to a charging process and a plurality of discharging operation signals corresponding to a plurality of discharging processes, so as to operate the plurality of switches, so that the plurality of switches switch electrical connection relationships of the plurality of capacitors; and
   a zero current detection circuit coupled between the controller and the output voltage, wherein the zero current detection circuit is configured to operably detect a charging resonant current in the charging process or detect a discharging resonant current in the plurality of discharging processes, wherein when the zero current detection circuit detects that a level of the charging resonant current or a level of the discharging resonant current is zero, the zero current detection circuit is configured to operably generate a zero current detection signal, which is inputted into the controller;
   wherein each of the charging operation signal and the discharging operation signals has a respective ON period, and wherein the ON periods do not overlap one another, so that the charging process and the plurality of discharging processes do not overlap one another;
   wherein in the charging process, the controller is configured to operably control the switching of the switches via the charging operation signal, so that a series connection of the capacitors and the at least one inductor is formed between the input voltage and the output voltage, which forms a charging path;
   wherein in each discharging process, the controller is configured to operably control the switching of the switches via a corresponding one of the discharging operation signals, so that a series connection of a corresponding one of the capacitors and the at least one inductor is formed between the output voltage and a ground voltage level, which forms a discharging path in each respective discharging process;
   wherein a plurality of discharging paths are formed in a sequential order in the plurality of discharging processes;
   wherein the charging process and the plurality of discharging processes are arranged in a repeated, alternating manner, so as to convert the input voltage to the output voltage.

2. The resonant switching power converter of claim 1, wherein the zero current detection circuit includes:
   a current sensing circuit, which is configured to operably sense the charging resonant current in the charging processes or sense the discharging resonant current in the plurality of discharging processes, so as to generate a current sensing signal; and
   a comparison circuit, which is configured to operably compare the current sensing signal with a reference signal, so as to generate the zero current detection signal.

3. The resonant switching power converter of claim 1, further comprising:
   a plurality of switch drivers, each of which is coupled between the controller and a corresponding one of the switches, wherein each switch driver is configured to operably control the corresponding switch according to the charging operation signal or the corresponding discharging operation signal.

4. The resonant switching power converter of claim 1, wherein after the plurality of discharging processes in a present cycle have completed, a following charging process in a next cycle begins after a delay interval from the completion of the plurality of present discharging processes in the present cycle, wherein all of the switches that operate in the charging and discharging processes are nonconductive during the delay interval.

5. The resonant switching power converter of claim 1, wherein the at least one inductor includes one single charging inductor and one single discharging inductor.

6. The resonant switching power converter of claim 5, wherein an inductance of the single charging inductor is equal to an inductance of the single discharging inductor.

7. The resonant switching power converter of claim 1, wherein the at least one inductor is one single inductor.

8. The resonant switching power converter of claim 7, wherein the one single inductor is a variable inductor.

9. The resonant switching power converter of claim 7, wherein in the charging process and in the plurality of discharging processes, the resonant switching power converter changes a voltage conversion ratio of the input voltage to the output voltage by keeping at least one of the plurality of switches to be ON and keeping at least two of the plurality of switches to be OFF.

10. The resonant switching power converter of claim 1, wherein the charging process has a charging resonant frequency, whereas, the plurality of discharging processes have a discharging resonant frequency, and wherein the charging resonant frequency is identical to the discharging resonant frequency.

11. The resonant switching power converter of claim 1, wherein the charging process has a charging resonant frequency, whereas, the plurality of discharging processes have a discharging resonant frequency, and wherein the charging resonant frequency is different from the discharging resonant frequency.

12. The resonant switching power converter of claim 1, wherein zero voltage switching is achieved by adjusting a duration period of the charging process.

13. The resonant switching power converter of claim 1, wherein zero voltage switching is achieved by adjusting at least one duration period of the plurality of discharging processes.

14. The resonant switching power converter of claim 1, wherein the resonant switching power converter is a bidirectional resonant switching power converter.

15. The resonant switching power converter of claim 1, wherein a voltage conversion ratio of the input voltage to the output voltage of the resonant switching power converter is 4:1, 3:1 or 2:1.

16. The resonant switching power converter of claim 1, wherein in the charging process, turned-ON time points and turned-OFF time points of the switches operating in the charging process are synchronous with a start time point and an end time point of a positive half wave of a charging resonant current of the charging process, so that zero current switching is achieved.

17. The resonant switching power converter of claim 1, wherein in the plurality of discharging processes, turned-ON time point and turned-OFF time point of the switches operating in the plurality of discharging processes are synchronous with the start time point and the end time point of a positive half wave of a discharging resonant current of one of the plurality of discharging processes, so that zero current switching is achieved.

* * * * *